(12) United States Patent
Wu (10) Patent No.: US 12,491,427 B2
(45) Date of Patent: Dec. 9, 2025

(54) TWISTING POSTURE TRAINING AID FOR INERTIA THROWING/STRIKING SPORTS INVOLVING ROTATION OF TORSO AXIS AND UPPER LIMBS

(71) Applicant: Chih Wei Wu, Las Vegas, NV (US)

(72) Inventor: Chih Wei Wu, Las Vegas, NV (US)

( * ) Notice: Subject to any disclaimer, the term of this patent is extended or adjusted under 35 U.S.C. 154(b) by 309 days.

(21) Appl. No.: 18/204,883

(22) Filed: Jun. 1, 2023

(65) Prior Publication Data

US 2024/0359080 A1   Oct. 31, 2024

(30) Foreign Application Priority Data

Apr. 25, 2023  (CN) .......................... 202310457306.9

(51) Int. Cl.
*A63B 69/36*   (2006.01)
*A63B 71/06*   (2006.01)

(52) U.S. Cl.
CPC .. *A63B 71/0622* (2013.01); *A63B 2071/0627* (2013.01); *A63B 2071/0636* (2013.01); *A63B 2071/0655* (2013.01); *A63B 2208/0204* (2013.01); *A63B 2220/13* (2013.01); *A63B 2220/806* (2013.01)

(58) Field of Classification Search
CPC ........ A63B 71/0622; A63B 2071/0627; A63B 2071/0636; A63B 2071/0655; A63B 2208/0204; A63B 2220/13; A63B 2220/806; A63B 69/38; A63B 24/0006; A63B 2220/805; A63B 2225/09; A63B 69/0002; A63B 69/3608; A63B 71/06; A63B 69/00; A63B 69/3667; A63B 2071/0694

USPC ........ 473/207–209, 212, 219–225, 257, 266, 473/267, 274, 276, 278

See application file for complete search history.

(56) References Cited

U.S. PATENT DOCUMENTS

| | | | | | |
|---|---|---|---|---|---|
| 3,353,282 | A | * | 11/1967 | Sneed ................ | A63B 69/0097 434/257 |
| 3,918,073 | A | * | 11/1975 | Henderson ............. | A63B 69/36 396/335 |
| 4,456,257 | A | * | 6/1984 | Perkins ............... | A63B 69/3608 473/220 |
| 6,386,988 | B1 | * | 5/2002 | Shearer .............. | A63B 69/3614 473/274 |
| 6,672,972 | B1 | * | 1/2004 | Stone ................. | A63B 69/3608 473/207 |

(Continued)

FOREIGN PATENT DOCUMENTS

WO    WO-2022187888 A1 *  9/2022   ......... A63B 69/3676

*Primary Examiner* — Nini F Legesse
(74) *Attorney, Agent, or Firm* — Che-Yang Chen; Law Office of Michael Chen (57) ABSTRACT

Disclosed is a twisting posture training aid for sports, including: an inertia-direction marker arrangement; a torso twist optical pointing arrangement which includes a banding arrangement, a first optical pointer, and a first pivot, such that when the user is at address, the torso marker corresponding to the inertia direction is projected onto the operation plane; an upper limb motion optical pointing arrangement which includes a fastener arrangement, a second optical pointer, and a second pivot, such that when the user is at address, the upper limb marker corresponding to the inertia direction is projected onto the operation plane.

3 Claims, 8 Drawing Sheets

(56) References Cited

U.S. PATENT DOCUMENTS

| | | | | |
|---|---|---|---|---|
| 6,733,153 | B1* | 5/2004 | Lee | F21V 21/29 |
| | | | | 362/427 |
| 7,306,525 | B2* | 12/2007 | Sawada | A63B 69/3608 |
| | | | | 473/212 |
| 9,295,896 | B1* | 3/2016 | Hoang | A63B 71/0622 |
| 2006/0022833 | A1* | 2/2006 | Ferguson | A63F 13/212 |
| | | | | 340/539.13 |
| 2007/0142119 | A1* | 6/2007 | Popin | A63B 69/3629 |
| | | | | 473/220 |

* cited by examiner

Prior Art

Fig. 1

Prior Art

Prior Art

Prior Art

TWISTING POSTURE TRAINING AID FOR INERTIA THROWING/STRIKING SPORTS INVOLVING ROTATION OF TORSO AXIS AND UPPER LIMBS

FIELD

Embodiments of the disclosure relate to posture training aids for sports, and more particularly relate to a twisting posture training aid for inertia throwing/striking sports involving rotation of torso axis and upper limbs.

BACKGROUND

Due to limitations by human mechanics and body structure, sports are closely associated with postures, e.g., speed of freestyle swimming and run races is influenced by postures; and for ball sports such as baseball, badminton, tennis, table tennis, and golf, the postures would influence inertia-direction stability and batting force applied to the ball. In addition to directly influencing the sports performance, correct postures can also prevent the players from sports injuries. For example, a player performing shot put or javelin throw, or an exerciser exercising the currently popular fitness weight training and yoga, is easily injured due to improper postures without a trainer's guide.

Figure 1:
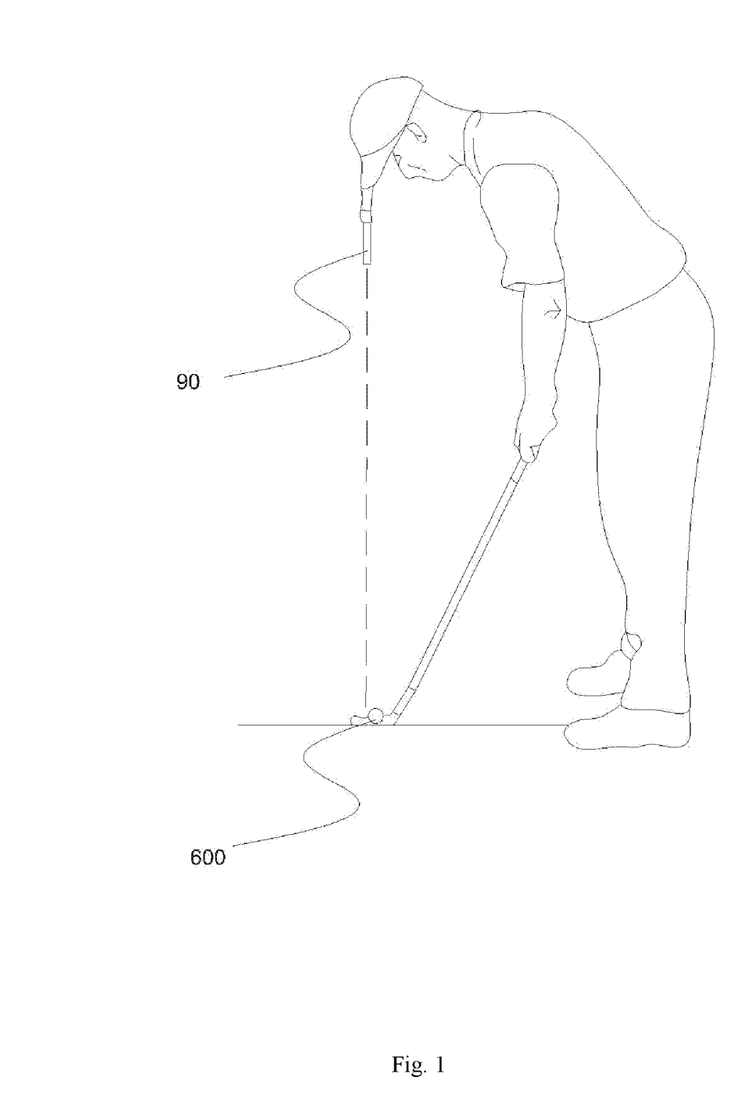
FIG. 1 is a stereoscopic view of an existing optical sight.

Therefore, the market has demands on technology-powered sports aids. It is desired that with such aids, players/exercisers can gain a higher efficacy and a better performance without injuries suffered. With golf as an example, the U.S. Appl. Pub. Ser. No. 2003/0045368 A1 discloses an optical projection device 90 which is configured to position the view of angle of the head so as to aid the user to keep their head oriented to face the golf ball 600 to be struck, as illustrated in FIG. 1 below; however, this previous invention fails to address involvement of any other body structures than the head. Even if a user may keep their head correctly oriented to face the golf ball so as to keep their eyes on the ball-striking spot with the aid of the disclosed product, the invention fails to offer any teaching on twisting of the torso and motions of the upper limbs; therefore, even if the head may be kept at a correct orientation during the golf striking process to precisely aim at the golf ball without missing the striking, it does no help in applying the force of the whole body to strike the ball farther.

Figure 2:
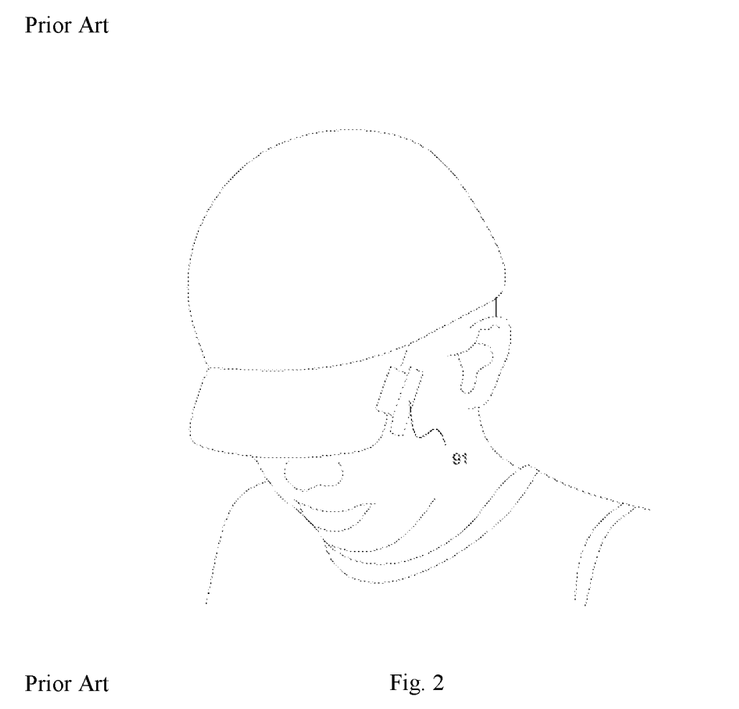
FIG. 2 is a stereoscopic view of wearing of an optical projection device of another existing golf train aid.
Figure 3:
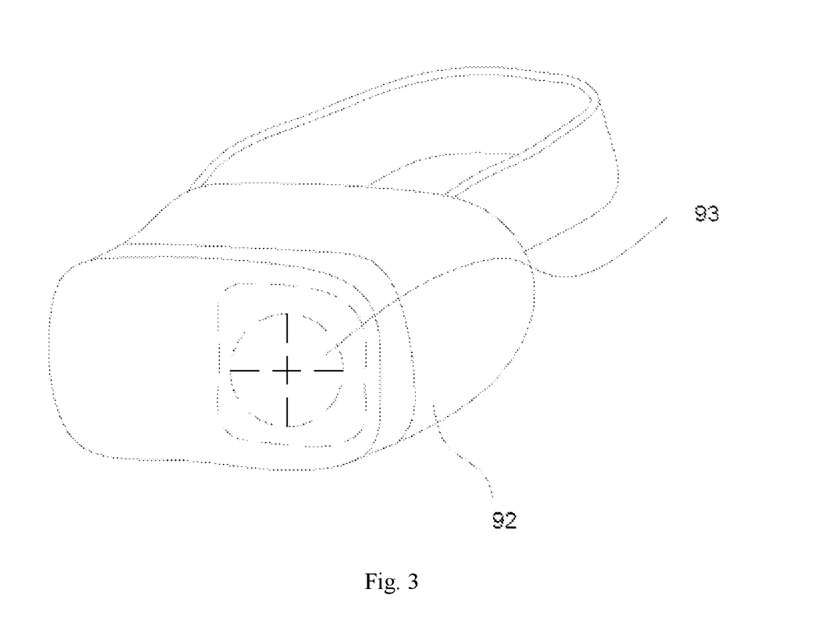
FIG. 3 is a stereoscopic view of an eyewear mated with the optical projector of FIG. 2.

FIGS. 2 and 3 below illustrate the U.S. Pat. No. 9,789,378, which also relates to improvement of sighting effect by using an optical projection device 91 mounted at the head or even a cross-hair arrangement 93 mounted via an angularly adjustable fixture or in an eyewear 92, to ensure a correct angular orientation maintained between the user's head/line of sight and the ball/striking spot.

However, as noted above, the muscles of the entire body will coordinate with each other to motion when performing a sport/exercise, and the athletic performance is highly associated with coordination between all parts of the body; therefore, body coordination is as important as the line of sight and striking angle. With ball sports as an example, irrespective of the golf, tennis, or baseball, only the precise line of sight and the force applied by the muscles in the wrists and hand axes cannot maximize the ball striking/batting effect. It is essential to sufficiently use leg supports to twist the waist while keeping the upper body spinning uprightly; before reaching the ball-striking spot, it needs to ensure that the torso twists only about the central column without front-back, left-right sway or torso pitch variation; throughout this stage, the upper arms need to maintain close to the torso to prepare for striking and the force applied by the upper limbs shall be strictly controlled till being released for the final swing, i.e., only when the club/racket/bat gets closest to the ball-striking spot, would the arms and hand axes be uncocked from the torso to explode, whereby the ball is struck/batted out with dexterity and angular tuning or other delicate manipulations. It is seen that well-coordinated system manipulation between various parts of the human body, particularly coordination between the upper limbs and the torso, is a common denominator of the striking/batting sports noted above; also, the player needs to keep their eyes on the ball spot without swaying with the torso or upper limbs. And for throwing sports such as shot put, although waist twisting and upper limb cocking are similar to those of the striking sports, their head motions are totally different, where the head turns backward with the torso and the shot is gripped in hand and placed in close contact with the chin; the head is only pointed forward when the body is twisted at address, and likewise, the arm and hand axis are also uncocked from the torso to propel the shot out. Therefore, it is fundamental to train a player on how to correctly twist the torso while keeping their upper limbs close to the torso till being uncocked at appropriate timing.

Figure 4:
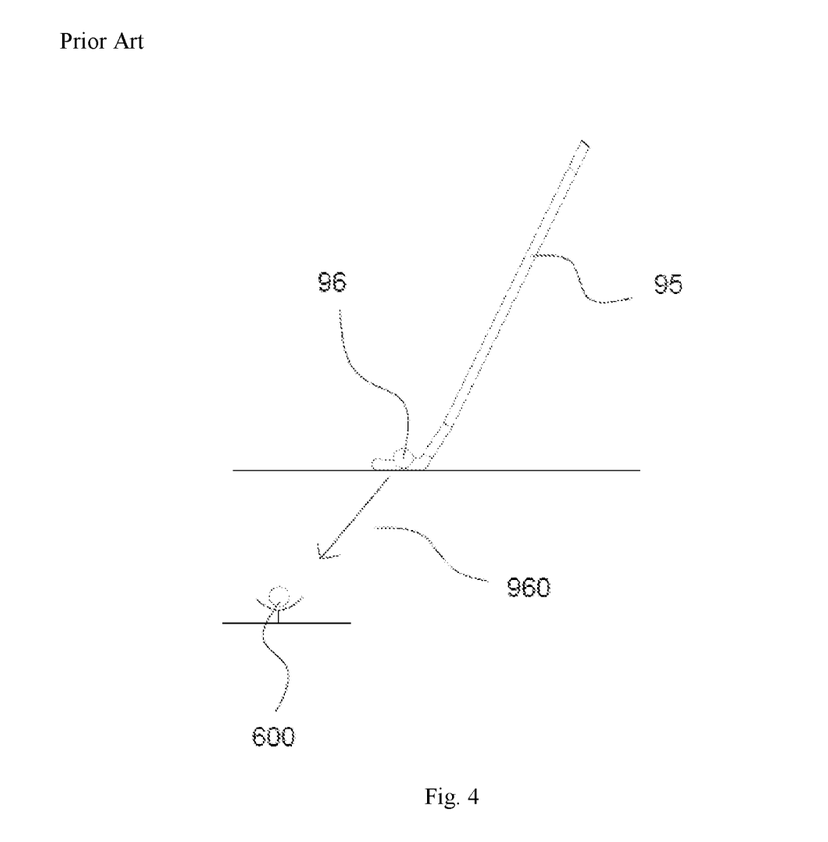
FIG. 4 is a stereoscopic view of a further known club sighting device.

Some other techniques have also been proposed, as illustrated in FIG. 4 below, where a laser beam generator 96 is mounted at the ball-striking face of the head of a golf club 95 to train the laser beam 960 to the target golf ball 600 such that the user swinging the club can hit the ball solidly; however, such techniques can only offer a point-to-point interactive relationship, i.e., corresponding only from the head of the user or a single point on the club head to the ball, which is only a guide based on the line of sight or only relates to correction of a club swing trajectory. Conventional technologies still cannot address such issues: coordinated motions between the head and the body, between the torso and the upper limbs, or between various body parts, or how to correctly swing the club/racket/bat in such a manner that various parts of the torso are coordinated at appropriate timing and uncocked at right timing, or how to keep the view angle of the head—the torso—the upper limbs at correct relative positions, or how to convert the relative positions for respective motion phases to visibly discernible and alarming signals, including how to improve body coordination of the user, etc.

In view of the above, sports involve a multi-system combination featuring coordinated motions of the body (and equipment); a problem to be solved by the disclosure is how to provide an accurate and prompt correction and guide by correctly observing and analyzing combined motions of various body parts in different phases on a time axis from setup stance, at-address posture, twisting backward to stay power, till twisting forward for ball-striking or throwing.

SUMMARY

In view of the drawbacks noted above, a twisting posture training aid for inertia throwing/striking sports involving rotation of torso axis and upper limbs is provided, which renders motions of main body parts promptly for purposes of correcting motion gestures of a user.

In some embodiments, a twisting posture training aid for inertia throwing/striking sports involving rotation of torso axis and upper limbs is provided, which intuitively displays interactive motions of various body parts on an operation plane to facilitate observation and reflection.

In some embodiments, a twisting posture training aid for inertia throwing/striking sports involving rotation of torso axis and upper limbs is provided, which enables transmission of information via light, audio, or vibration so as to return error posture information to a user for rolling-wave correction.

In some embodiments, the disclosure provides a twisting posture training aid for inertia throwing/striking sports involving rotation of torso axis and upper limbs, configured to render a torso marker for an about-torso-axis twist state and an upper limb marker for a movement state of a user who is performing an inertia throwing/striking sport by twisting about the twist axis extending along the torso of the user and manipulating with an upper limb of the user, respectively, wherein the inertia throwing/striking sport refers to throwing/striking a sports equipment, which is subjected to a power exerted by the user against a throwing/striking spot due to the user's twisting about the torso axis and motion of the upper limb, away from the user following an inertia direction, the twisting posture training aid comprising: at least one inertia-direction marker arrangement configured to calibrate a marker corresponding to the inertia direction on an operation plane spaced from the user's torso; a torso twist optical pointing arrangement worn at the user's torso, comprising: a banding arrangement configured to be securely bound to the torso of the user; a first optical pointer configured to render, with directivity, the torso marker for the about-torso-axis twist state onto the operation plane; and a first pivot configured to pivot-fit the first optical pointer to the banding arrangement with an adjustable angle such that when the user is postured at address leading up to performance of the inertia throwing/striking sport, a projection of a torso marker corresponding to the inertia direction is presented onto the operation plane; and an upper limb motion optical pointing arrangement worn at the upper limb of the user, comprising: a fastener arrangement configured to be securely bound to the upper limb of the user; a second optical pointer configured to render, with directivity, twisting movement of the upper limb about the torso axis onto the operation plane; and a second pivot configured to pivot-fit the second optical pointer to the fastener arrangement with an adjustable angle such that when the user is postured at address, a projection of an upper limb marker corresponding to the inertia direction is presented on the operation plane.

The twisting posture training aid for inertia throwing/striking sports involving the rotation of torso axis and upper limbs disclosed by the disclosure calibrates an ideal direction for batting the sports equipment away using cooperation between the inertia-direction marker arrangement, and enables easily detectable optical renderings of the inertia-direction marker, the optical torso marker projected by the torso twist optical pointing arrangement, and the upper limb marker projected by the upper limb motion optical pointing device, on the operation plane, whereby on one hand, whether interactive motions between various body parts are connect are clearly shown, and on the other hand, whether postures of various body parts are consistent with the ideal direction of the target ball to strike or the sports equipment to throw may also be clearly shown; furthermore, a prompt alarm feedback may be further presented to facilitate the user to intuitively know body parts motion trajectories and states during each phase of a sport in real time, whereby to correct the user's postures to exert an optimal ball-striking or throwing effect and mitigate unnecessary sports injuries.

DETAILED DESCRIPTION

Hereinafter, embodiments of the disclosure will be explained through specific embodiments, and those skilled in the art may easily understand the advantages and effects of the disclosure via the contents described herein.

The structures, scales, and sizes illustrated in the accompanying drawings are only for facilitating those skilled in the art to understand and read the contents described herein, not for limiting implementation of the disclosure. Any structural modifications, size adjustments or scale variations shall fall within the scope of the disclosure without substantially changing the technical contents.

Figure 5:
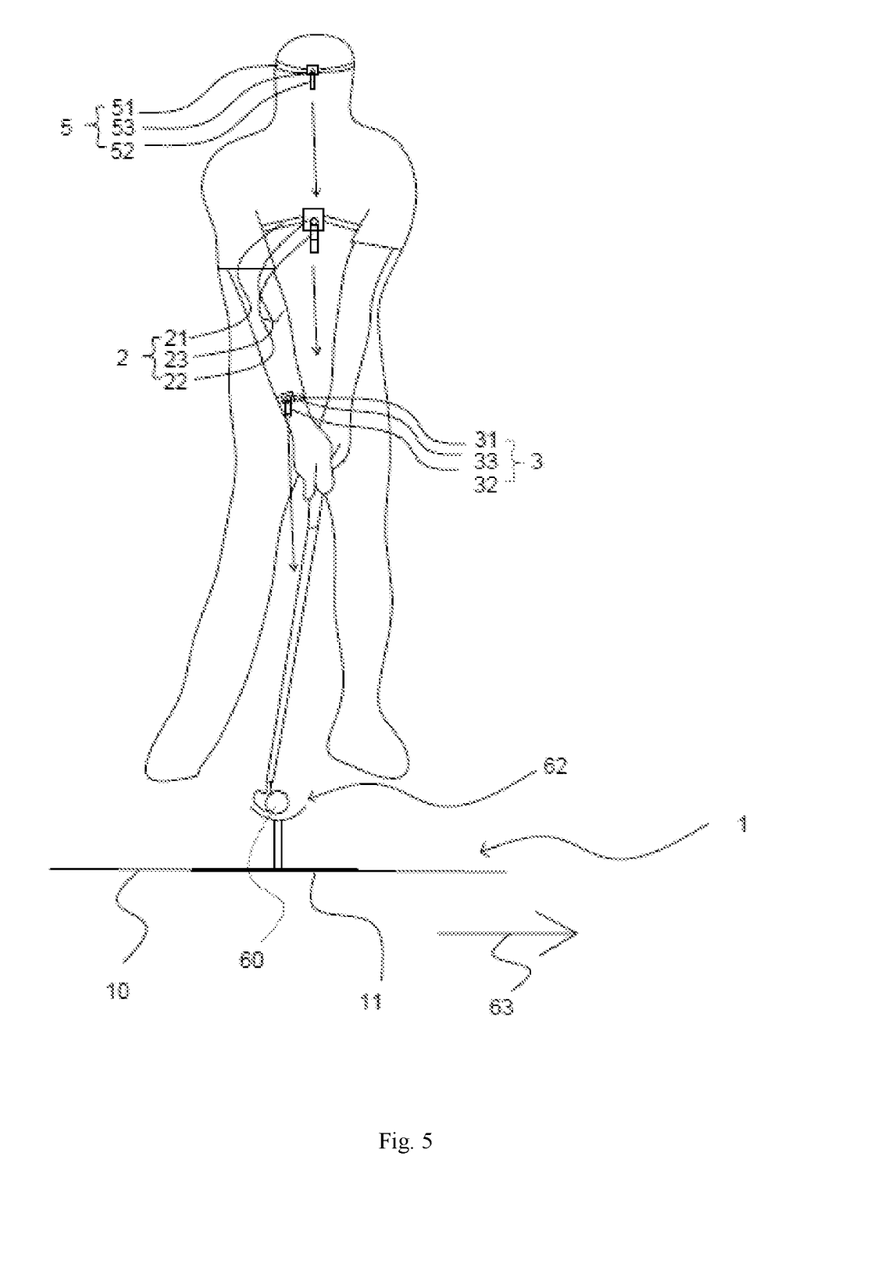
FIG. 5 is a front view of a first preferred embodiment of the disclosure, which uses golf training as an example to illustrate a stereoscopic structural relationship with respect to twist posture training.

FIG. 5 illustrates a twisting posture training aid for inertia throwing/striking sports involving rotation of torso axis and upper limbs according to the disclosure, where golf is taken as an example. To ease the description, in this embodiment, the ground surface/turf surface surrounding sports equipment 60 (in this example, a golf ball) is defined as an operation plane 10, and irrespective of being on the front wall of an indoor golf facility or in front of a golf driving range, a desired inertia flight trajectory of a flying golf ball will be preset, for example, the image of a green projected on a drill facility wall; an inertia direction 63 is set based on the inertia flight trajectory, and a corresponding inertia-direction marker 11 is defined on the operation plane based on the inertia direction 63, e.g., a white plastic mark pointing forward is embedded in the operation plane of the driving range; in this way, a user may determine their stance based on the calibrated inertia-direction marker 11, their body height, hand length, and club length, and maintain an appropriate distance with respect to the operation plane 10. Of course, those skilled in the art may readily appreciate that the white plastic mark in this embodiment may be alternatively an optical projection or any visible physical structure, all of which may serve as the inertia-direction marker arrangement 1 as a reference mark for the user or other observers.

FIG. 5 illustrates a setup stance of the user, where a torso twist optical pointing arrangement 2 is mounted at the thoracic-abdominal part of the upper body, and an upper limb motion optical pointing arrangement 3 is mounted at a wrist of the user; in this embodiment, a head optical pointing arrangement 5 is additionally mounted at the head of the user. The torso twist optical pointing arrangement 2 is mounted such that a first optical pointer 22 is pivot-fitted to a banding arrangement 21 in an angularly adjustable manner via a first pivot 23 passing through for example a universal joint fixture; in this embodiment, the banding arrangement 21 is for example a sports vest with a strap, which secures the whole set of torso twist optical pointing arrangement 2 to the user's torso; the upper limb motion optical pointing arrangement 3 is likewise mounted such that a second optical pointer 32 is pivot-fitted to a fastener arrangement 31 in an angular adjustable manner via a second pivot 33, where the fastener arrangement 31 is for example a wrist band with a hook-and-loop tape, which secures the whole set of upper limb motion optical pointing arrangement 3 to a wrist of the user; it is also so for the head optical pointing arrangement 5, which is mounted such that a third optical pointer 52 is affixed to a wear piece 51 in an angularly adjustable manner via a third pivot 53, the wear piece 51 being worn at the user's head. To ease the description, the position where the golf ball rests is defined as a striking spot 62 (in other sports like shot put, the striking spot 62 is also referred to as a throwing spot).

Figure 6:
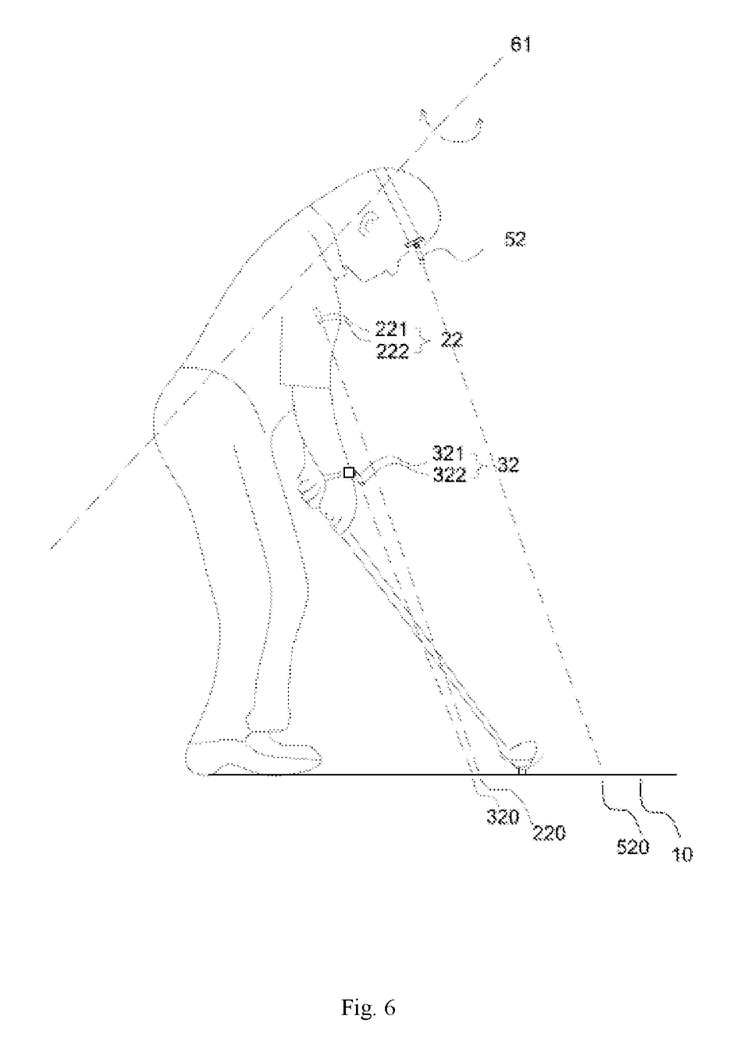
FIG. 6 is a side view of the embodiment of FIG. 5, illustrating relative positions of a torso axis, an operation plane, a torso marker, an upper limb marker, and a head marker.
Figure 7:
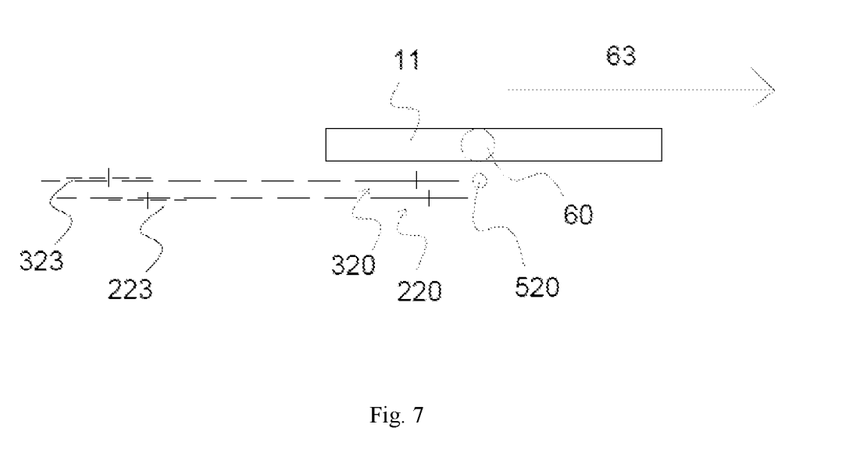
FIG. 7 is a top view of the operation plane in the embodiment of FIG. 5, illustrating motion conditions of the torso marker and the upper limb marker in the at-address phase of a user from a setup stance to a backward twisting stance.

FIGS. 6 and 7 illustrate the setup stance for throwing/striking with the arrangements having been worn, where the first optical pointer 22 projects a torso marker 220 corresponding to the user's torso onto the operation plane 10, the second optical pointer 32 projects an upper limb marker 220 corresponding to the user's upper limb onto the operation plane 10, and the third optical pointer 52 projects a head marker 520 corresponding to the user's head onto the operation plane 10. To further assist the user in positioning precisely, a cross-shaped cursor with different line lengths is employed for displaying purposes, where a first light-emitting unit 221 of the first optical pointer 22 uses a beam-expansion laser marker as the light source, which projects a slightly expanded laser beam; an occlusion mask is additionally mounted in front of the first light-emitting unit 221, both of which constitute a first optical unit 222, whereby the torso marker 220 is rendered as a cross-shaped optical marker with a longer horizontal line and a shorter vertical line. In the various sports noted above, twisting of the torso requires smoothness without swaying; therefore, a virtual torso axis 61 extending vertically is defined herein, and twisting condition of the user's torso is projected onto the operation plane using the first optical pointer which emits a cross-shaped optical marker with one line longer and the other line shorter.

When the user stands sideways at the setup position facing the ball-striking spot, the cross-shaped optical marker projected by the worn torso twist optical pointing arrangement comprises a longer line vertical to the torso axis 61 and pointed to a green image in the front; since the torso axis is inclined with respect to the ground surface, the inclination angle is compensated for by the first pivot; when it is assured that the inclination angle of the torso is fixed without sway, the longer side of the optical marker moves forward and back parallel to the white plastic mark on the ground surface. In this example, a second light-emitting unit 321 of the second optical pointer 32 likewise renders the upper-limb marker 320 into a cross-shaped optical marker with a longer horizontal line and a shorter vertical line via a second optical unit 322 in the front; here, in order to emphasize the importance of the longer side, the optical marker marking the upper limb motion is defined as a transverse optical marker, where the angle is adjusted by the second pivot 33 such that the upper limb marker 320 is parallel to the cross-shaped cursor of the torso marker 220 and corresponds to the inertia-direction marker 11.

When the user twits their torso backward and swings the club backward at address, a correct performance is to twist the torso about the original torso axis without sway, while the upper limbs and the torso maintain the same angle and stretching extent without relative angle or stretching variation. Therefore, the torso marker 220 and the upper-limb marker 320 both move backward along the inertia direction 63, without occurrence of a marker or fluctuation significantly deviating from the inertia direction or a significant speed difference therebetween.

Figure 8:
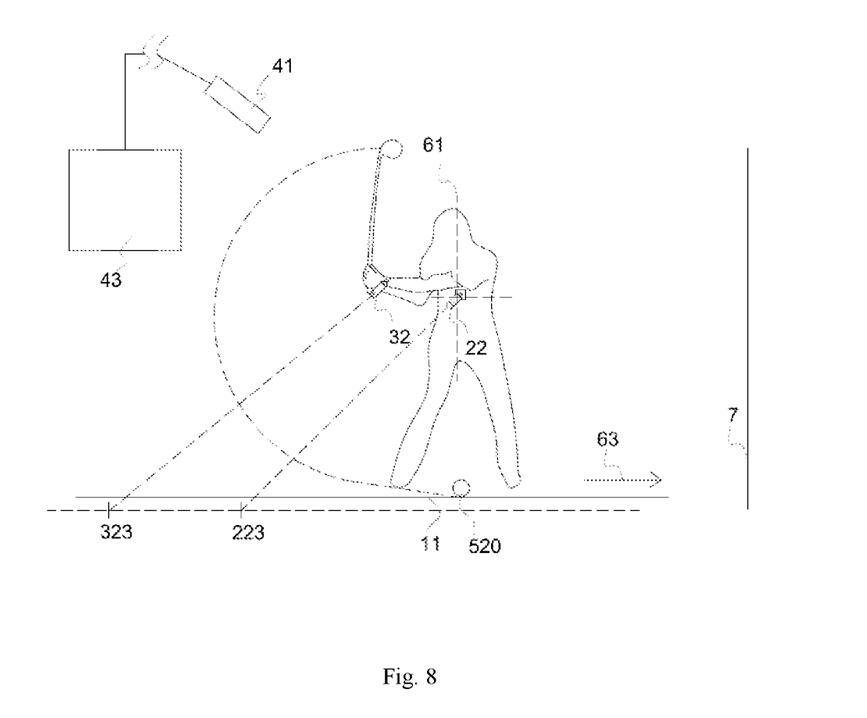
FIG. 8 is a side view of the operation plane of the user's backward twisting at address in the embodiment of FIG. 5, illustrating relative positions of the inertia-direction marker, the torso axis, the torso marker, the upper limb marker, an optical signal sensing device, an information processing device, and an interception and display device.

FIG. 8 illustrated the next move, where throughout the process of twisting the torso at address, the user's head should not turn with the torso or sway with the upper limb; therefore, the head marker 520, which is here exemplified as a spot shape, projected by the head optical pointing arrangement onto the operation plane should not deviate from the sports equipment 60 (a golf ball in this example), such that the user's head maintains a posture directly facing and aiming at the sports equipment 60; as such, the optical pointers for the torso marker, the upper limb marker, and the head marker 520 are simultaneously rendered on the ground plane 10, for the user to view and promptly adjust their at-address posture.

The user twists their torso backward about the fixed torso axis 61 to stay power, and the torso marker moves therewith on the operation plane, whereby the trajectory exhibits a torso marker 223 for a corresponding twisted state; the upper limb is driven by the waist to move, such that the upper limb marker 320 also moves therewith on the operation plane 10, where the trajectory exhibits the upper limb marker 323 for a movement state; while the head marker 520 should be still kept at the sports equipment 60 to reduce deviation. When the user twists back from the rear to face the throwing/striking spot 62 to perform ball striking, the upper limb exerts more power, and upon reaching the throwing/striking spot 62, the torso marker 220 and the upper limb marker 320 on the operation plane 10 should be parallel to each other and correspond to the inertia-direction marker 11, whereby the association state in which the three markers are parallel to each other at the at-address stance is reproduced; if the sports equipment 60 is struck at the throwing/striking spot now, it may fly along a possibly best inertia direction 63. The user can timely correct their posture to prevent wrong power application by observing the signal feedbacks from different markers on the operation plane 10, whereby to improve precision of the flight track and trajectory of the ball which has been struck. Of course, an optical signal sensor device 41, for example a video camera, and an information processing device 43 may also be employed to recognize and record images, as references for post-training review and analysis.

Throughout the phases from the setup stance, the backward torso twisting at address, till the torso twisting back to strike the ball, the torso markers 220 and 230, the upper limb markers 320 and 323, and the inertia-direction marker on the ground surface, shall be kept mutually parallel as much as possible, which indicates that during the process, the torso and upper limb postures are the best for striking, whereby to correct the torso-upper limb postures so as to strike the golf ball in the optimal inertia direction in the next phase. Since all associated body parts have been rendered on the ground plane by respective optical markers and the user should keep their head pointed to the golf ball before ball striking, all torso states can be easily, directly observed and corrected by the user themselves, whereby fundamental self-training of a correct posture is achieved; furthermore, to intercept the flying golf ball, an interception cloth screen may be placed in the inertia direction as an interception and display device 7, where images such as a simulated green is projected and rendered onto the cloth screen in front of the user.

Figure 9:
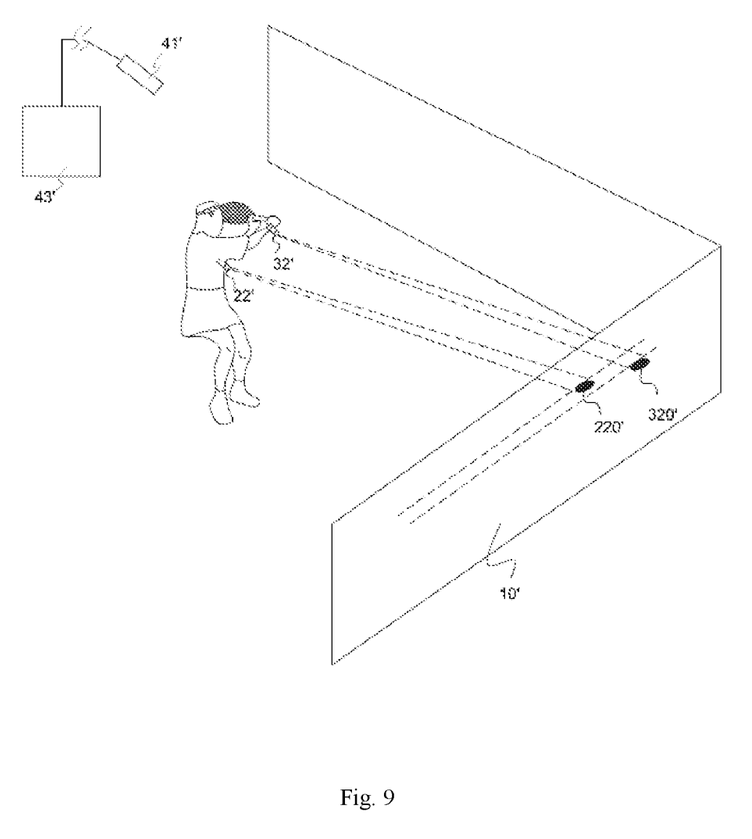
FIG. 9 is a stereoscopic view of a second preferred embodiment of the disclosure, illustrating relative positions of a torso, a torso axis, a torso twist optical pointing arrangement, and an upper limb optical pointing arrangement in tennis training, as well as relative relationships between the operation plane, the torso marker, and the upper limb marker.

Of course, the training related to in the disclosure is not limited to golf. All other sports with a similar sports mode may apply the training aid disclosed herein for training, as illustrated in FIG. 9. For racket sports such as tennis and ping pong, on one hand, the player needs to keep the eyes on the ball batted from the opponent or estimate the ball landing point in the opposite field as well as the net height; and on the other hand, the player also needs to twist their torso backward to stay power before batting, and premature uncocking of the upper limb or uncoordinated power exertion asynchronous with the torso should also be avoided during the process from the setup stance, the backward twisting at address, till twisting back to the front to bat the ball; therefore, coordinated motions of the torso and the upper limbs are also a training focus. However, unlike the golf sport, an operation plane 10' in this tennis embodiment is provided on a wall sideways to the user. Since the torso marker 220' projected by the torso twist optical pointing arrangement 2' and the upper limb marker 320' projected by the upper limb motion optical pointing arrangement cannot be directly observed by the user themselves, the tangential optical marker rendered by the torso marker 220' and the transverse optical marker rendered by the upper limb marker 320' are not of a cross shape or a spot shape, but an elongated oval shape easy for electronic identification, where the longitude axis corresponds to the inertia direction of the ball, and the longitude axis direction is defined as the longer side.

Meanwhile, an optical signal sensing device is additionally mounted to capture the torso marker and the upper limb marker on the operation plane 10' and transmit the captured torso marker for the torso twist state and the captured upper limb marker for the movement state to the information processing device 43' for movement trajectory analysis; if a posture deviation is detected, for example, the spacing between movement trajectories of the torso marker 220' and the upper limb marker 320' is too large, it indicates that the upper limb is uncocked prematurely, and then the user may be alarmed via an alarm device 42'; in this embodiment, the alarm device 42' is exemplified as a force feedback device which maintains a body sensing state with the user via a banding arrangement or fastener arrangement. Once the posture is biased or the throwing/striking spot 62' is not ideal for batting, force feedback devices can generate a vibration at their corresponding locations, such that the user can clearly feel whether the upper limb swings too fast or too slowly, or whether the torso is twisted insufficiently or excessively; of course, different vibration frequencies may be employed to alarm the user to correct their postures promptly. Relevant information may also be stored for the user to review for posture adjustment later.

Figure 10:
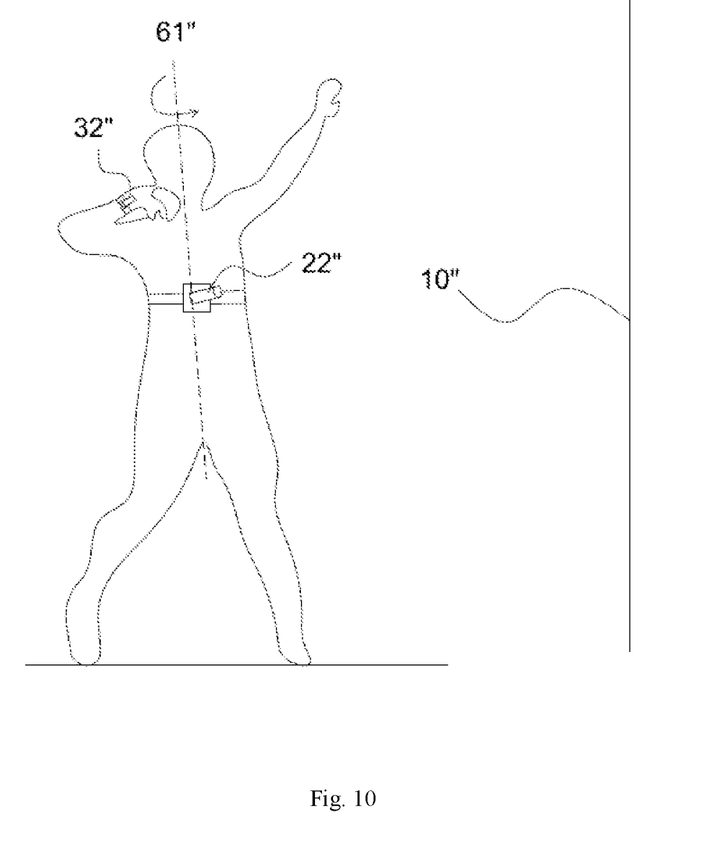
FIG. 10 is a schematic diagram of a third preferred embodiment of the disclosure, illustrating relative positions of the torso, the torso axis, a torso twist optical pointing arrangement, and an upper limb optical pointing arrangement for shot put.

The disclosure may also be applied to throwing sports such as shot put, as illustrated in FIG. 10. For the shot put sport, when the torso twists backward about the torso axis 61", the head also needs to twist backward synchronously with the torso; therefore, no optical marker device is provided at the head, while the alarm changes to be an earpiece or a loudspeaker to alarm the user; if the optical signal sensing device detects that either of the torso marker projected by the first optical pointer 22" and rendered on the operation plane 10" and the upper limb marker rendered by the second optical pointer 32" significantly deviate from the preset inertia-direction marker, i.e., deviated into a deviation area, it indicates that the user's posture has been seriously deviated, and then the user in performance will be alarmed by audio so as to correct promptly.

In addition, for sports such as golf and tennis, an interception and display device may be set in the inertia direction of the batted ball, which, on one hand, serves to intercept the batted golf, and on the other hand, displays a corresponding scene and the movement trajectory of the sports equipment along the inertia direction, thereby aiding the user to mitigate field limitations and simulate real scenes. In addition, those skilled in the art may readily appreciate that in a simplified version, the optical markers may simply take on a round shape, e.g., the first optical pointer worn on the torso may project a relatively large round spot as the torso marker, while the second optical pointer worn on the wrist projects a smaller round spot as the upper limb marker, or different colors may be applied to the markers, all of which can facilitate the user to make adjustments.

What have been described above are only preferred embodiments of the disclosure, which are not intended for limiting the scope of the disclosure. Any simple equivalent alterations and modifications made according to the scope of the disclosure and the contents in the specification shall fall within the protection scope of the disclosure.

I claim:

1. A twisting posture training aid for inertia throwing/striking sports involving rotation of torso axis and upper limbs, configured to render a torso marker for an about-torso-axis twist state and an upper limb marker for a movement state of a user who is performing an inertia throwing/striking sport by twisting about the twist axis extending along the torso of the user and manipulating with an upper limb of the user, respectively, wherein the inertia throwing/striking sport refers to throwing/striking a sports equipment, which is subjected to a power exerted by the user against a throwing/striking spot due to the user's twisting about the torso axis and motion of the upper limb, away from the user following an inertia direction, the twisting posture training aid comprising:

at least one inertia-direction marker arrangement configured to calibrate a marker corresponding to the inertia direction on an operation plane spaced from the user's torso;

a torso twist optical pointing arrangement worn at the user's torso, comprising:

a banding arrangement configured to be securely bound to the torso of the user;

a first optical pointer configured to render, with directivity, the torso marker for the about-torso-axis twist state onto the operation plane; and a first pivot configured to pivot-fit the first optical pointer to the banding arrangement with an adjustable angle such that when the user is postured at address leading up to performance of the inertia throwing/striking sport, a projection of a torso marker corresponding to the inertia direction is presented onto the operation plane;

and an upper limb motion optical pointing arrangement worn at the upper limb of the user, comprising:

a fastener arrangement configured to be securely bound to the upper limb of the user;

a second optical pointer configured to render, with directivity, twisting movement of the upper limb about the torso axis onto the operation plane; and a second pivot configured to pivot-fit the second optical pointer to the fastener arrangement with an adjustable angle such that when the user is postured at address, a projection of an upper limb marker corresponding to the inertia direction is presented on the operation plane, wherein the first optical pointer comprises a first light emitting unit and a first optical unit disposed in front of the first light emitting unit, whereby a tangent optical marker vertical to a projection of the torso axis is projected onto the operation plane, the tangent optical marker being configured to mark twisting of the user's torso about the torso axis on the operation plane; and the second optical pointer comprises a second light emitting unit and a second optical unit disposed in front of the second light emitting unit, whereby a transverse optical marker is projected such that when the upper limb twists synchronously with the torso, the transverse optical marker is parallel to the tangent optical marker on the operation plane;

an optical signal sensing device configured to measure image data of the tangent optical marker and the transverse optical marker projected on the operation plane; and an alarm device configured to emit an alarm when either of the tangent optical marker and the transverse optical marker deviates from the inertia-direction marker.

2. The twisting posture training aid according to claim 1, further comprising:

an optical signal sensing device configured to measure image data of the tangent optical marker and the transverse optical marker projected on the operation plane;

an information processing device configured to receive optical image data transmitted from the optical signal sensing device; and an alarm device configured to emit an alarm when the information processing device determines that change of spacing between movement direction of the tangent optical marker and movement direction of the transverse optical marker amounts to a predetermined spacing.

3. The twisting posture training aid according to claim 2, wherein the alarm device further comprises a force feedback device disposed at the banding arrangement and/or the fastener arrangement.

* * * * *